D. A. T. GALE.
Nut Roaster.
No. 81,159.
Patented Aug. 18, 1868.
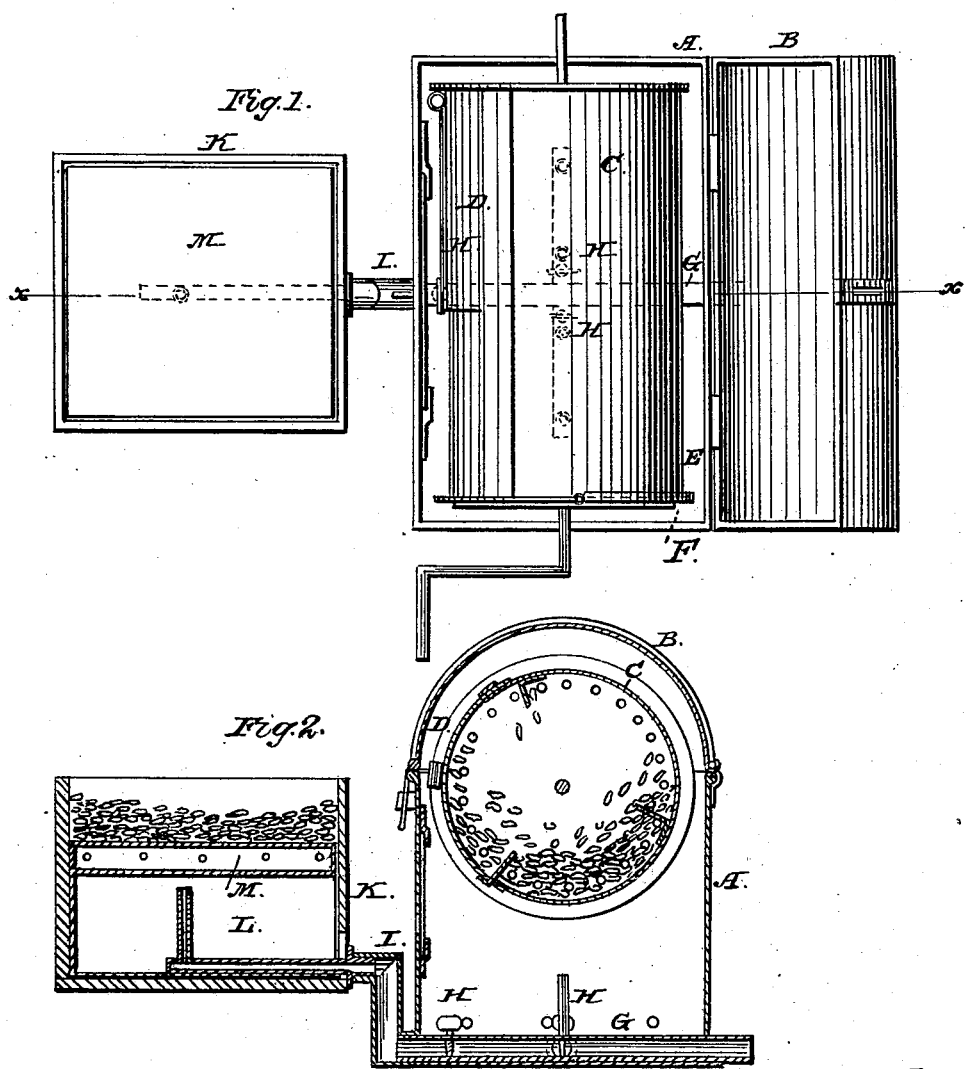
Witnesses
Wm A Morgan
G. C. Cotton
Inventor
D. A. T. Gale
Per. Munn & Co
Attorneys

UNITED STATES PATENT OFFICE.

D. A. T. GALE, OF POUGHKEEPSIE, NEW YORK.

ROASTER FOR NUTS.

Specification forming part of Letters Patent No. 81,159, dated August 18, 1868.

*To all whom it may concern:*

Be it known that I, D. A. T. GALE, of Poughkeepsie, in the county of Dutchess and State of New York, have invented a new and useful Improvement in Roasting Nuts, &c.; and I do hereby declare that the following is a full, clear, and exact description thereof, which will enable others skilled in the art to make and use the same, reference being had to the accompanying drawings, forming a part of this specification.

The object of this invention is to produce a simple and convenient apparatus for roasting nuts by the use of gas, and also for keeping them warm after they are roasted.

It consists of a rotary cylinder suitably confined in a hot-air case, and provided with gas burners, and of a warming apparatus to which the tube which supplies gas to the roasting apparatus is connected for supplying heat to it, and so arranged that after the nuts have been roasted and placed in the said warming apparatus, the flow to the roasting-burner may be stopped while that to the warming apparatus continues.

In the drawings, Figure 1 represents a plan view of my improved apparatus, with the cover of the roasting-case removed. Fig. 2 represents a cross-section of the same taken on the line $x\ x$ of Fig. 1.

Similar letters of reference indicate corresponding parts.

A represents a suitable metallic case of tinned iron or other material, provided with a hinged cover, B, and with suitable orifices for the admission of air to support combustion; also with openings through which to observe the volume of the flame. C represents a hollow cylinder also made of sheet-iron, and arranged to rotate within the said case on bearings at each end. It is provided with an opening in the side, which is covered by a slide, D, and also with a hinged cover, E, at one end, which is fastened by a button, F, oscillating on the shaft of the cylinder.

In the bottom of the case A a gas-tube, G, is arranged, and provided with suitable burners, preferably those which are provided with an orifice at the base for the admission of air for assisting combustion. It is also provided with cocks H, for shutting off the communication of the gas with the said burners, and with an extension, I, through the case and into the warming apparatus K, which consists of a metal vessel provided with a heating chamber, L, and a hot-air chamber, M, which is set in the bottom of any suitable box, barrel, or other article which will hold the nuts above the said warming-vessel.

It is an important matter with retailers of roasted nuts to preserve them in a warm condition after they have been roasted, as, by cooling and rewarming, they become materially deteriorated, while, if kept moderately warm, they will retain their flavor for a long time; hence the combination with a roasting apparatus of a simple and convenient means for keeping them warm is a desirable adjunct of the same.

The apparatus may be made of various sizes, to suit the demands of all classes of dealers; and by the use of gas for heating them, no smoke or offensive dust or delay from lighting fires is encountered.

By the cocks H, either apparatus may be heated while the gas is shut off from the other.

Having thus described my invention, what I claim as new, and desire to secure by Letters Patent, is—

1. The described arrangement of the perforated case A, having the hinged cover B, the rotating cylindrical heater C, gas-pipe G I, provided with burners, case K, heating-chamber L, and hot-air chamber M, as herein described, for the purposes specified.

2. The arrangement of the gas-pipe G I, having the burners and cocks with relation to the roasting-cylinder C and warming apparatus K, whereby heat is applied to C K simultaneously or alternately, as herein described, for the purpose specified.

D. A. T. GALE.

Witnesses:
    ABM. W. IRISH,
    EDGAR VINCENT.